United States Patent [19]

Peterson

[11] 4,286,442
[45] Sep. 1, 1981

[54] FLEXIBLE COUPLING

[75] Inventor: Robert R. Peterson, Hudson, Mass.

[73] Assignee: Barry Wright Corporation, Watertown, Mass.

[21] Appl. No.: 9,870

[22] Filed: Feb. 7, 1979

[51] Int. Cl.³ .............................................. F16D 3/04
[52] U.S. Cl. ...................................... 64/31; 64/11 R; 64/27 NM
[58] Field of Search ............. 64/11 R, 31, 16, 27 NM

[56] References Cited

U.S. PATENT DOCUMENTS

| | | | |
|---|---|---|---|
| 1,669,931 | 5/1928 | Dowrie | 64/31 |
| 2,007,513 | 7/1935 | Westburgh | 64/31 |
| 2,075,481 | 3/1937 | Thomas | 64/31 |
| 2,109,935 | 3/1938 | Thomas | 64/31 |
| 2,110,844 | 3/1938 | Shenk | 64/31 |
| 2,131,414 | 9/1938 | Westburgh | 64/31 |
| 2,513,684 | 7/1950 | Shenk | 64/31 |
| 3,404,545 | 10/1968 | Walker | 64/31 |
| 3,519,260 | 7/1970 | Irwin | 64/11 R |
| 3,952,546 | 4/1976 | Nakano et al. | 64/27 NM |
| 4,012,923 | 3/1977 | Lundgren | 64/27 NM |

FOREIGN PATENT DOCUMENTS

| | | | |
|---|---|---|---|
| 724498 | 4/1932 | France | 64/31 |
| 479629 | 2/1938 | United Kingdom . | |
| 489044 | 7/1938 | United Kingdom . | |
| 670279 | 4/1952 | United Kingdom . | |
| 1193482 | 6/1970 | United Kingdom . | |
| 1543131 | 3/1979 | United Kingdom . | |

OTHER PUBLICATIONS

PCT Publication No. WO 79/00033, Greene, Jan. 25, 1979.

*Primary Examiner*—Ira S. Lazarus
*Attorney, Agent, or Firm*—Milton E. Gilbert; Gary E. Ross

[57] ABSTRACT

An improved Oldham type coupling comprising elastomeric laminated bearings between the conventional bearing surfaces to improve the compression load capacity of the bearing surfaces of the coupling as well as provide other advantages. In one embodiment the bearings are designed so that the coupling is capable of operating as a constant velocity coupling.

10 Claims, 9 Drawing Figures

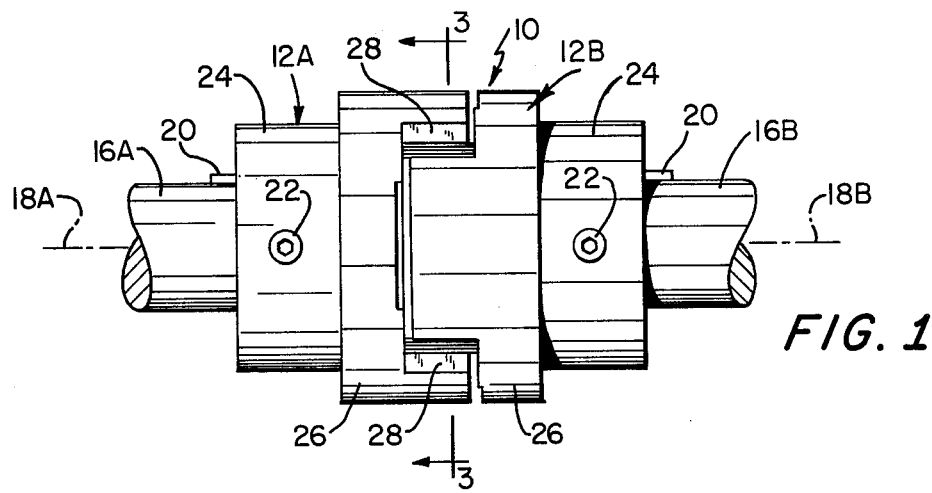
FIG. 1
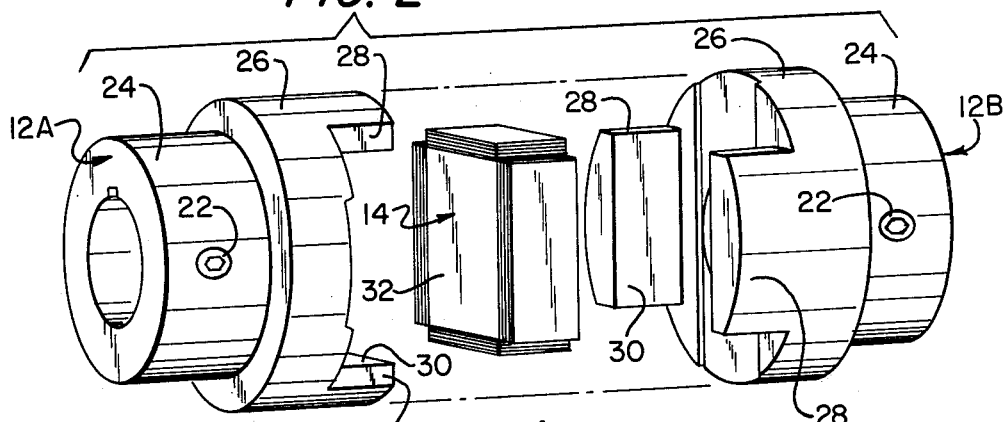
FIG. 2
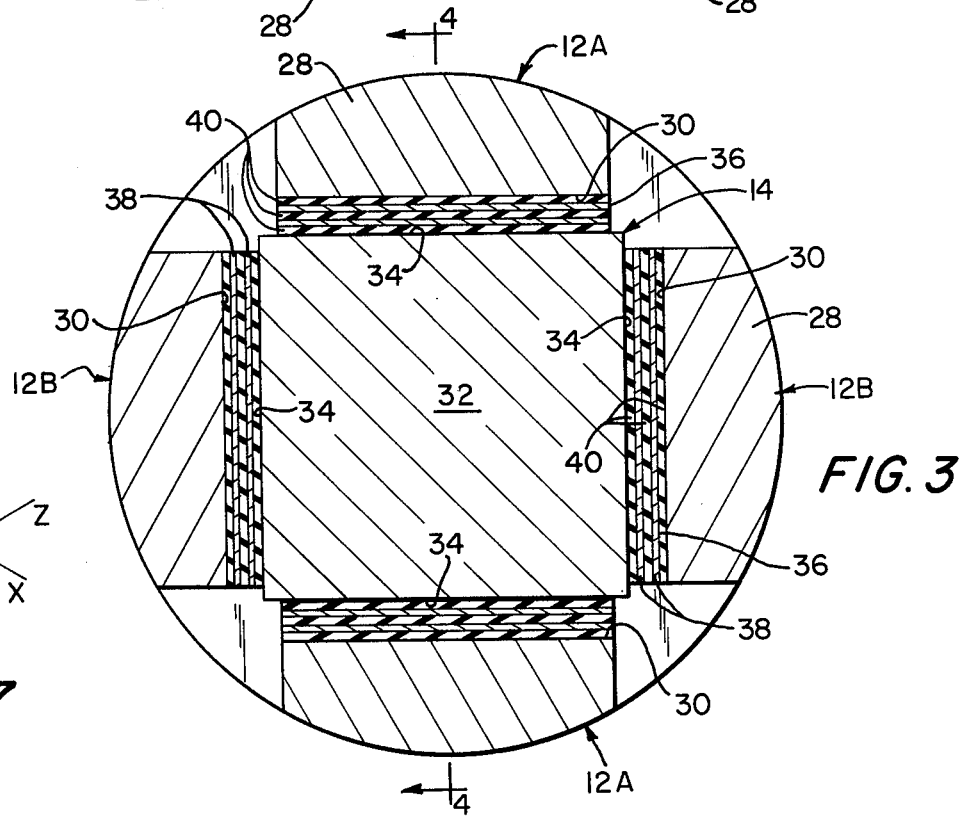
FIG. 7
FIG. 3

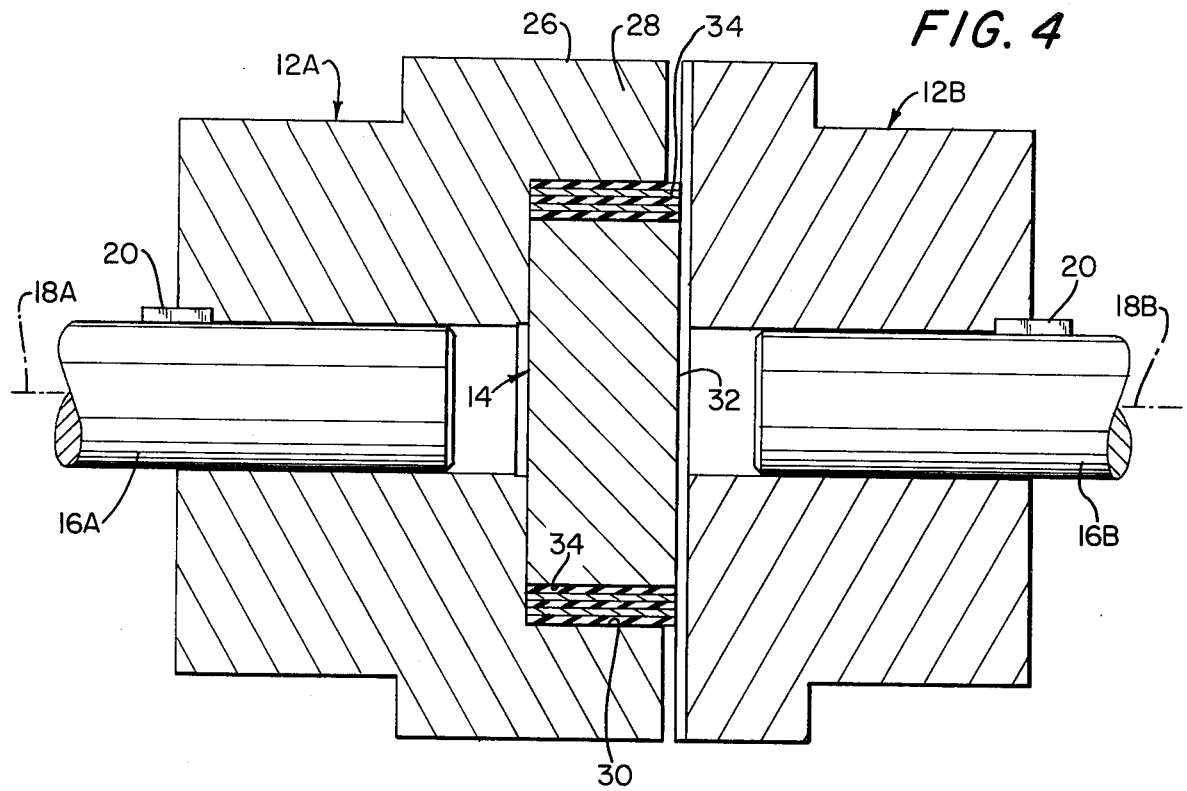
FIG. 4
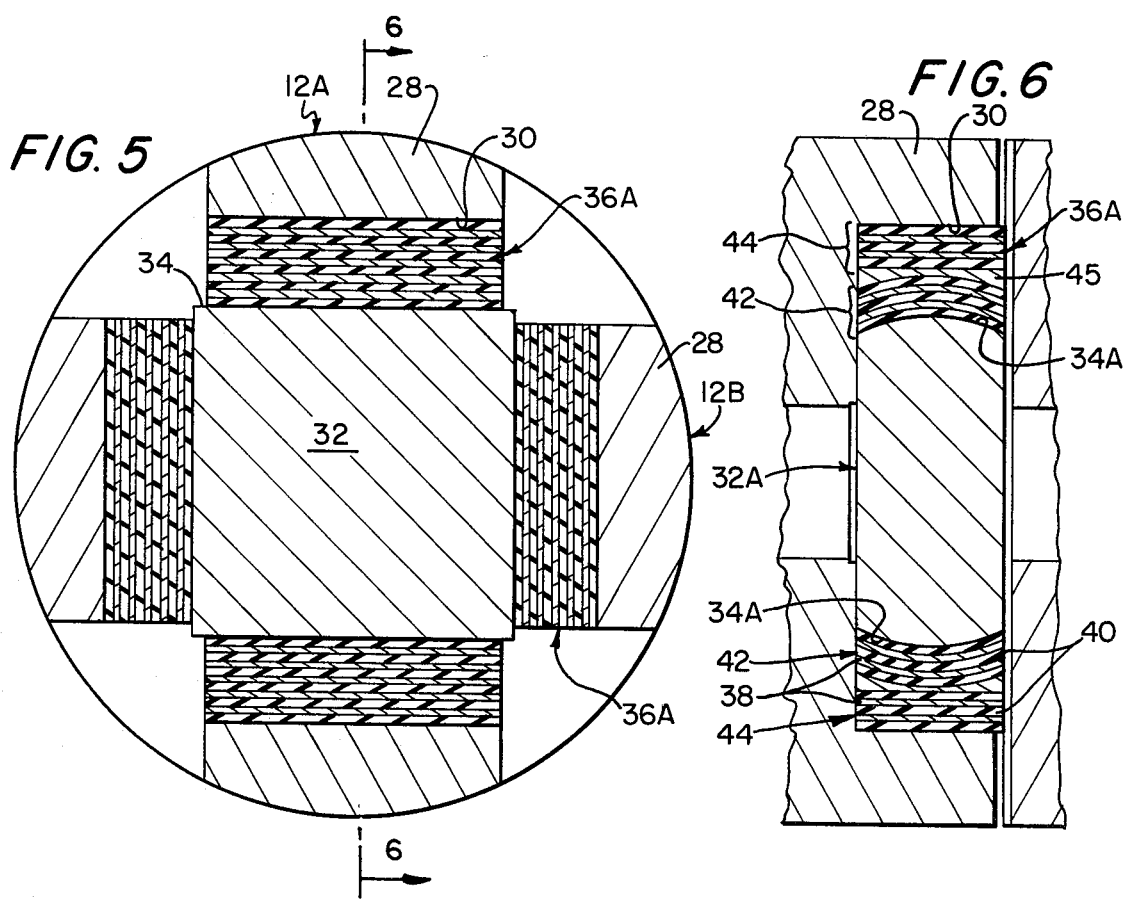
FIG. 5
FIG. 6

FLEXIBLE COUPLING

The present invention relates generally to couplings and more particularly to flexible couplings for transmitting torque between a driving member and a driven member.

One type of flexible coupling, often referred to as an Oldham coupling, is useful in joining driving and driven members having axes of rotation which are either aligned, or are parallel and slightly displaced from one another. Two forms of Oldham couplings are often described in the prior art (See, for example, McGraw-Hill Encyclopedia of Science and Technology; McGraw-Hill Book Company, New York City, New York; 1960; Volume 9, page 311 and Kent's Mechanical Engineers' Handbook, Design and Production Volume; Edited by Carmichael, C., Twelfth Edition; Wiley Engineering Handbook Series; John Wiley & Sons, Inc.; New York City, New York (1950), pp. 15.21–15.22). Generally, couplings employing the Oldham principles comprise two yokes or hubs fitted on the respective ends of the driving and driven members, the latter typically being rotatable shafts, and connected together through at least one intermediate member. Each hub is typically provided with a slot or groove.

In the conventional Oldham coupling, the intermediate member comprises a floating member, shaped as a disk. The floating disk includes a key or tongue on and extending diametrically across each side of the disk. The two keys are disposed in mutually orthogonal directions with respect to one another. The slot of each hub is made relatively narrow and is adapted to mate with a respective key of the disk, so as to provide two degrees of freedom to accommodate axial displacement (where the rotation axes are parallel but displaced from one another). This form of Oldham coupling allows considerable end play and lateral misalignment (up to 5% of shaft diameter under favorable conditions). It is often used for speeds under 100 rpm and for heavy torque loads up to the full shaft capacity, as in connecting a gear reducer to a driven machine.

In a more modern coupling, employing the Oldham principle, the intermediate member comprises a floating square block member adapted to mate with relatively wide-mutually orthogonal slots of the two hubs to provide a similar two degrees of freedom with respect to lateral misalignment. This coupling essentially has larger bearing surfaces (between the block and sides of the slots in the hub) than that provided in the more conventional form of Oldham coupling, so that the more modern form is capable of general-purpose work at substantially greater speeds. The more modern coupling has been known to compensate for misalignments as high as 10% of the shaft diameter.

These traditional forms of Oldham couplings must always be provided with a lubricant at the bearing surfaces in order to prevent excessive wear and stress. Even when lubricated energy is lost as a result of a heat loss due to friction between the bearing surfaces. For example, typical coefficients of friction between the lubricated metal-to-metal bearing surfaces varies from between about 0.08 to about 0.20 (an average of 0.14). Such relatively high coefficients of friction are directly proportional to energy losses. Further, neither form can accommodate much angular misalignment. The conventional Oldham coupling has been described as being capable of accommodating only one degree of angular misalignment while the more modern form has been described as accommodating three degrees of angular misalignment. Any angular misalignment greater than these, can reduce reactionary stresses in the bearing surfaces as well as the shafts. Where a thick layer of solid, integrally-formed, conventional rubber is disposed between bearing surfaces, or where the entire intermediate block member of the more modern type of Oldham coupling is made of solid, integrally-formed, conventional rubber, typical values of maximum compression stress levels along the bearing surfaces of these couplings is about 500 psi. Thus, for maximum life, the driving and driven shafts should be accurately aligned at installation.

It is a general object of the present invention to provide an improved coupling which overcomes or substantially reduces the problems of the prior art couplings.

More specifically, objects of the present invention are to provide an improved coupling of the Oldham type which (1) requires no lubrication, (2) reduces or substantially eliminates heat loss at the bearing surfaces thereby conserving energy, (3) is provided with improved bearing surfaces capable of carrying substantially greater maximum compression stress levels, (4) more easily accommodates axial misalignment, (5) is provided with improved bearing surfaces capable of providing restoring forces resulting from angular and-/or axial misalignment, and (6) is provided with improved bearing surfaces capable of accommodating shearing motion resulting from misalignment of the shafts.

These and other objects of the present invention are achieved by an improved coupling of the type including a driving member rotatable about a first axis, a driven member rotatable about a second axis and at least one intermediate member. The driving and driven members each include means defining a first pair of spaced-apart bearing surfaces and the intermediate member includes means operatively connecting the driving member to the driven member and having second and third pairs of spaced-apart bearing surfaces. Each of the second and third pair is associated with one of the first pair of bearing surfaces and is disposed with respect to the associated first pair so that each bearing of the first pair is disposed adjacent and opposite to a respective bearing surface of the second or third pair. The improvement comprises elastomeric laminated bearing means, disposed between the adjacent bearing surfaces of the intermediate member and the driving and driven members. In one embodiment such elastomeric laminated bearing means are designed so as to provide a constant velocity coupling.

Other features and many attendant advantages of the invention are disclosed in or rendered obvious by the following detailed description taken in connection with the accompanying drawing wherein:

FIG. 1 is a side elevational view of one embodiment of the coupling of the present invention in operative assembly with a driving and a driven shaft;

FIG. 2 is an exploded perspective view of the embodiment shown in FIG. 1;

FIG. 3 is a cross-sectional view of the embodiment of FIG. 1 taken along line 3—3 of FIG. 1;

FIG. 4 is a longitudinal sectional view of the embodiment of FIG. 1 taken along line 4—4 of FIG. 3;

FIG. 5 is a cross-sectional view of a second embodiment of the present invention similar to and illustrating a modification of the embodiment shown in FIG. 3 and capable of operating as a constant velocity coupling;

FIG. 6 is a longitudinal sectional view, partially cut away, of the second embodiment of FIG. 5 taken along line 6—6 of FIG. 5;

FIG. 7 is a schematic perspective view of the intermediate member of the first and second embodiments of FIGS. 1-6;

In the drawing the same numerals are used to designate identical or like parts.

Figure 8:
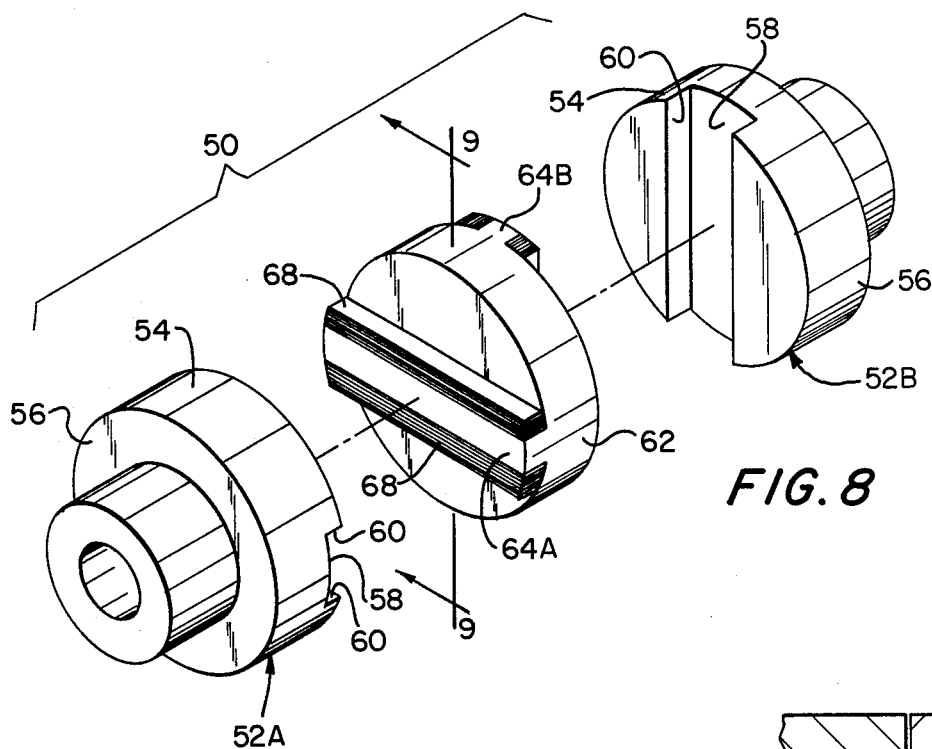
FIG. 8 is an exploded perspective view of a third embodiment of the present invention.

Referring more particularly to the drawing, and more specifically to FIGS. 1-4, the coupling 10, designed in accordance with the present invention, generally includes identical driving and driven members, in the form of yokes 12A and 12B, and an intermediate member 14. Coupling 10 is adapted to join a driving member to a driven member, the driving and driven members being shown in FIG. 1 as shafts 16A and 16B, respectively, each mounted by suitable means, such as rotational bearings (not shown), so as to be rotatable about the corresponding rotation axes 18A and 18B.

The shafts 16A and 16B support at their perspective ends in any well known manner yokes 12A and 12B, secured thereto by suitable means, such as keys 20 and set screws 22, which retain the yokes in nonrotatable relation with their respective shafts 18. Alternatively, the yokes can be integrally-formed with the respective shafts. Each yoke 12 comprises a collar 24 and integral therewith an annular flange section 26 having parallel outwardly projecting bosses 28, the respective inner flat surfaces 30 of which are disposed parallel to one another so as to form bearing surfaces for engagement with the intermediate member 14 when coupling 10 is assembled. Bosses 28 of yoke 12A have their bearing surfaces 30 disposed at right angles to the corresponding bearing surfaces 30 of yoke 12B so that the four bearing surfaces 30 thus in effect substantially enclose a square block-shaped volume within which intermediate member 14 is received.

The intermediate member 14 comprises a square block 32. The block is provided with opposite flat sides 34 which extend parallel to one another and also form bearing surfaces. Each side of the block extends parallel to the adjacent bearing surface 30 of the corresponding yoke when the coupling 10 is assembled. To the extent described the construction is that of a conventional modern form of coupling of the type employing the principles of an Oldham coupling. In such a coupling each side 34 of block 32 directly engages the corresponding adjacent bearing surface 30. The prior art block accordingly is typically constructed entirely of a resilient material, such as rubber, so as to absorb compressional forces arising from torque transmission through the shafts 16 and to accommodate motions from cocking, i.e. angular misalignment, of the two shafts 16. However, even with the use of such resilient materials such a coupling, prior to the present invention was typically capable of carrying compressive stress levels on such bearing surfaces in the order of 500 psi and a very small amount of angular misalignment.

According to the present invention, coupling 10 further comprises elastomeric bearing means, disposed between each side 34 of block 32 and the adjacent bearing surface 30 of each boss 28, for providing substantially an improved bearing structure between block 32 and yokes 12. The elastomeric bearing means are preferably "high compression laminate" bearing units 36. Each unit generally includes alternate layers 38 and 40, respectively of an elastomeric material, such as rubber or certain plastics, and a nonextensible material, such as a metal, with the outermost and innermost layers preferably being of the resilient material. The layers are bonded together for example with a suitable bonding cement with the innermost and outermost layers respectively engaging (e.g. by bonding or force fitting) the adjacent side of block 32 and adjacent surfaces 30 of the corresponding boss 28. By utilizing such elastomeric bearing units, undesirable vibration can be at least partially dampened and noise, as well as vibration-induced wear and stress reduced. Further energy is conserved since little or no heat is generated between the bearing surfaces. Further, due to the resiliency of the elastomeric material, these bearing units provide counteracting restoring forces to shearing motion. The size, thickness and number of layers of each bearing unit 36 and the durometer of the elastomeric material depends upon the particular compression stress levels to be expected and the amount of coupling misalignment (i.e., angular and axial misalignment between shafts 16A and 16B) to be accommodated.

The particular design of each bearing unit 36 can also vary depending upon the particular load application. For example, as shown in FIGS. 2-4 each bearing unit 36 is shown as a "flat" bearing, wherein each layer 38 and 40 is essentially of a flat rectangular shape. Alternatively, and preferably, each bearing unit 36 is designed to include a combination of a flat bearing section and cylindrical bearing section.

More specifically, referring to FIGS. 5 and 6, in the preferred form, each bearing unit 36A includes a cylindrical bearing section 42 and flat bearing section 44, each section including a plurality of alternating layers 38 and 40, respectively of resilient material and nonextensible material, with a single intermediate layer 45 of resilient material disposed between the two sections. In this embodiment, the outermost resilient layer of flat section 44 engages the bearing surface 30 of the adjacent boss 28 in a similar manner as bearing 36 in FIGS. 1-4 and has its innermost layer engaging the outer flat surface of intermediate layer 45. However, block 32 of FIGS. 1-4 is modified as shown at 32A in FIGS. 5 and 6 so that the surfaces of the sides 34A are cylindrical surfaces. The cylindrical bearing section 42 is preferably disposed between the flat bearing section 44 and block 34A. Each of the layers of the cylindrical bearing section 42 is cylindrical and has its outermost and innermost layers shaped to mate with and be secured to the respective inner surface of intermediate layer 45 and the adajcent surface of the side 34A of block 32A. The radii of curvature of the individual layers of the cylindrical bearing section 42, as well as the cylindrical bearing surfaces of sides 34A, are such that the axes of revolution of the layers of the cylindrical sections 42, and the cylindrical bearing surfaces of sides 34A which are on opposite sides of the block 32A, are all aligned and preferably pass through the center of mass of the block 32. Thus, referring to the schematic drawing of block 32A, shown in FIG. 7 (where the axes X, Y and Z intersect at the center of mass of block 32A) the layers of those cylindrical bearing sections 42 and the sides 34A of block 32A which extend parallel to axis X will have their axes of revolution disposed coaxial with axis X. Similarly, the layers of those cylindrical bearing sections 42 and the sides 34A of block 32A which extend parallel to axis Y will have their axes of revolution disposed coaxial with Y axis. The Z axis is an axis defined by the shaft rotation axes 18A and 18B when the axes are aligned.

The size, thickness and number of layers of each section 42 and 44 as well as intermediate layer 45 of each bearing unit 36A and the durometer of the elastomeric material again depends upon the particular compression loads to be expected. However, preferably, the rotational spring rate, (i.e. the spring rate determined in response to pure torque applied about the Z axis (and thus axes 18)) of the cylindrical bearing sections 44 in the direction parallel to the X axis, should be substantially equal to the rotational spring rate of the flat bearing sections 42 in the direction parallel to the Y axis. Similarly, the rotational spring rate of the cylindrical bearing section 44 of the bearings oriented in the direction parallel to the Y axis should be substantially equal to the rotational spring rate of the flat bearing sections 42 oriented in the direction parallel to the X axis. By designing the bearings in this manner so that the rotational spring rates are as described, an equal compressive load in response to torque applied about the Z axis, is carried by all sides of the block so that the block "floats", i.e. will only move parallel to the X or Y axes in response to axial misalignment or displacement of axes 18.

Further, the cocking spring rate, a spring rate responsive to shearing forces from cocking or axial misalignment of axes 18, of the flat bearing sections 42 is substantially greater (preferably by several orders of magnitude, e.g., 100 times), and thus is substantially stiffer than the cocking spring rate of the cylindrical bearing sections 44. This feature is provided so that when axial misalignment between axes 18 occurs, almost all shear will be accommodated by the cylindrical bearing sections 44, and very little accommodated by the flat bearing sections 42. This feature, combined with the facts that (1) the center of curvature of the cylindrical bearing sections lies along the corresponding X and Y axes which intersect with each other and the Z axis at a common center, (2) axes 18 intersect at this center when axial misalignment occurs, and (3) the X-Y plane (defined by the X and Y axes) always bisects the angle formed by axes 18 at this common center when axial misalignment occurs, makes the coupling thus described with respect to FIGS. 5-7 a constant velocity coupling. Thus, when torque is applied to one shaft 16 at a fixed velocity the torque is transmitted through the coupling so that the other shaft will rotate at this velocity regardless of whether axes 18 are aligned or angularly misaligned.

Figure 9:
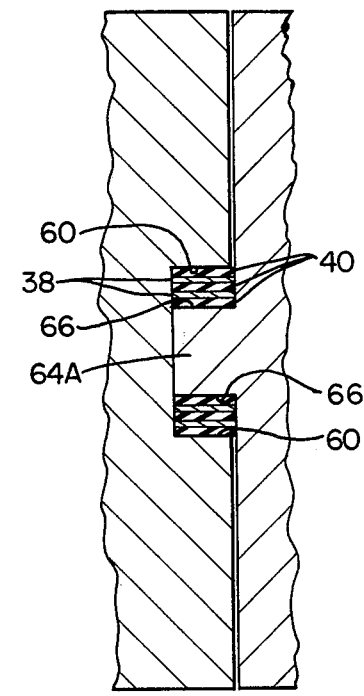
FIG. 9 is a longitudinal view, partially cut-away, of the third embodiment of FIG. 8 taken along line 9—9 of FIG. 8.

The above principles of the present invention can also be applied to the more conventional Oldham couplings. Such a coupling incorporating the principles of the present invention is shown in FIGS. 8 and 9. The coupling 50, generally includes yokes 52A and 52B, which are similar to yokes 12A and 12B, except that the bosses 54, formed on the annular flange sections 56 are substantially closer to one another so as to form on each yoke a slot 58 diametrically disposed across annular section 56 with the sides of slot 58 defining the parallel bearing surfaces 60.

The coupling 50 also comprises intermediate member 62 the latter preferably being a disk-shaped element of substantially the same diameter as the diameter of annular flange section 56. Each side of the member 62 is provided respectively with key or tongue 64A and 64B the sides of each key providing bearing surfaces 66. Each key 64 extends diametrically across the intermediate member, with one key being oriented in a perpendicular direction with respect to the other. The yokes 52A and 52B are oriented so that each key 64 is adapted to mate with a slot 58 of a respective yoke. In the conventional coupling the bearing surfaces provided by each key engage a bearing surface of a corresponding slot so that the coupling can accommodate axial misalignment between the driving and driven members. In accordance with the present invention, elastomeric laminated bearing units 68 are provided between each bearing surface 66 of each key 64 and the adjacent bearing surface 60 in each slot 58. Each elastomeric bearing unit 68 is preferably a high compression laminated bearing of alternate layers 38 and 40 of resilient and non-extensible materials bonded to each other, with the inner and outer most layers being of resilient material. As shown, preferably the bearing units are flat bearings with the size, thickness and number of layers of each bearing and durometer of the elastomeric material depending upon the particular compression loads to be expected.

The invention as herein described has many advantages, over the prior art couplings. For one, by using elastomeric, high compression laminated bearings the compressive loads which can be carried by these bearings can be increased. For example, in the more modern form of Oldham coupling the compressive load/stress which can be carried is increased as much as twenty fold when compared with a conventional coupling where the intermediate block member is made of solid, conventional rubber. The result occurs due to the increased shape factor provided by such bearings with a consequential decrease in stress from bulging. By using high compression laminated bearings the bearing surfaces need not be lubricated, mechanical wear can be reduced and energy conserved. Energy losses, due to hysteresis effects in the elastomer between the bearing surfaces are typically in the order of 0.01, well below that of the lubricated metal-to-metal bearing surfaces provided by the prior art. Since the coefficient of friction is directly proportional to energy losses, the lower coefficient of friction provides an energy savings of an average 13% or 14%. Due to the elastomeric nature of the bearings, undesirable vibration can be at least partially dampened and noise, as well as vibration induced wear and stress can be reduced. The elastomer material provides restoring forces due to misalignment and is capable of accommodating angular and axial misalignment as well as shearing motion resulting from such misalignment. Finally, by providing elastomeric bearings of the types shown in FIGS. 5 and 6 having both cylindrical and flat laminate sections, each designed to have rotational and cocking spring rates as described, a constant velocity coupling is achieved. Still other advantages will be obvious to persons skilled in the art.

What is claimed is:

1. In a flexible coupling of the type comprising a driving member rotatable about a first axis; a driven member rotatable about a second axis; and an intermediate member; said driving and driven members each including means defining a first pair of spaced apart bearing surfaces; and said intermediate member including means operatively connecting said driving member to said driven member and having second and third pairs of spaced-apart bearing surfaces; each of said second and third pairs being (a) associated with one of said first pairs and (b) disposed with respect to the associated first pair so that each bearing surface of a first pair is disposed adjacent and opposite to a respective bearing surface of the second or third pair, the improvement comprising:

bearing means coupling each of the bearing surfaces of said driving and driven members to a different bearing surface of said intermediate member, said bearing means comprising a plurality of elastomeric laminated bearing units, ech disposed between and engaging one of the bearing surfaces of said second and third pairs and an adjacent bearing surface of one of said first pairs; wherein each of said elastomeric laminated bearing units comprises alternate layers of an elastomeric material and a nonextensible material; and wherein said bearing surfaces of said second and third pairs are cylindrical surfaces and said bearing surfaces of said first pairs are flat surfaces, and each of said bearing units includes a cylindrical section and a flat section engaging respectively the corresponding cylindrical and flat surfaces.

2. In a flexible coupling of the type comprising a driving member rotatable about a first axis; a driven member rotatable about a second axis; and an intermediate member; said driving and driven members each including means defining a first pair of spaced apart bearing surfaces; and said intermediate member including means operatively connecting said driving member to said driven member and having second and third pairs of spaced-apart bearing surfaces; each of said second and third pairs being (a) associated with one of said first pairs and (b) disposed with respect to the associated first pair so that each bearing surface of a first pair is disposed adjacent and opposite to a respective bearing surface of the second or third pair, the improvement comprising:

bearing means coupling each of the bearing surfaces of said driving and driven members to a different bearing surface of said intermediate member, said bearing means comprising a plurality of elastomeric laminated bearing units, each disposed between and engaging one of the bearing surfaces of said second and third pairs and an adjacent bearing surface of one of said first pairs; wherein each of said elastomeric laminated bearing units comprises alternate layers of an elastomeric material and a nonextensible material; wherein each bearing surface of said first pair is a flat surface and each bearing surface of said second and third pair is a cylindrical surface; and wherein said intermediate member is a block, and said second and third pairs of bearing surfaces are each opposite sides of said block, and said driving and driven members each include a yoke having oppositely disposed surfaces defining said first pair of bearing surfaces.

3. A flexible coupling according to claim 2, wherein said cylindrical surfaces corresponding to said second pair have a common first axis of revolution and said cylindrical surfaces corresponding to said third pair have a second common axis of revolution.

4. A flexible coupling according to claim 3, wherein said first and second common axes are perpendicular to and intersect one another at a common point.

5. A flexible coupling according to claim 4, wherein said first and second rotation axes are perpendicular to and intersect said first and second common axes at said common point when said first and second axes are aligned.

6. A flexible coupling according to claim 5 wherein said common point is the center of mass of said block.

7. A flexible coupling according to claim 4, wherein each of said bearing units includes a cylindrical section engaging a corresponding one of said cylindrical surfaces and a flat section engaging a corresponding one of said flat surfaces.

8. A flexible coupling according to claim 7, wherein each of said cylindrical and flat sections includes an alternate layer of elastomeric and nonextensible material, wherein the rotational spring rate of each of the cylindrical sections engaging a respective one of the surfaces of said second pair is substantially equal to the rotational spring rate of each of the flat sections disposed between each of the surfaces of the third pair and the surface of the associated first pair, and the rotational spring rate of each of the cylindrical sections engaging a respective surface of said third pair is substantially equal to the rotational spring rate of each of the flat sections disposed between each surface of second pair and the surface of the associated first pair.

9. A flexible coupling according to claim 7 wherein the cocking spring rate of said flat sections is substantially larger than the cocking spring rate of said cylindrical sections.

10. A flexible coupling according to claim 9, wherein the cocking spring rate of said flat sections is larger by several orders of magnitude than the cocking spring rate of said cylindrical sections.

* * * * *